UNITED STATES PATENT OFFICE.

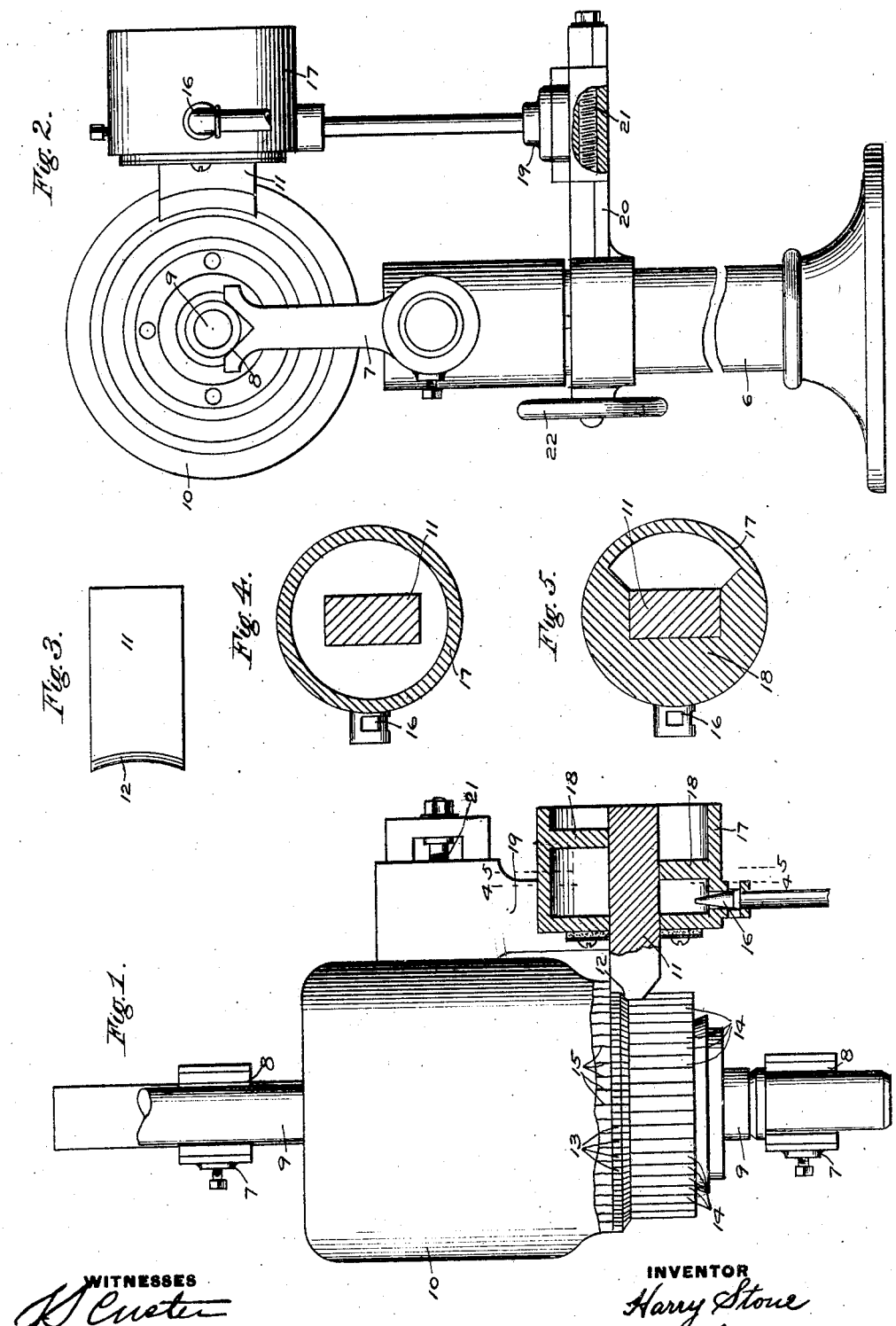

HARRY STONE, OF WILMERDING, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

SOLDERING-MACHINE FOR COMMUTATORS.

No. 896,951.   Specification of Letters Patent.   Patented Aug. 25, 1908.

Application filed September 23, 1905. Serial No. 279,784.

*To all whom it may concern:*

Be it known that I, HARRY STONE, a citizen of the United States, residing in Wilmerding, county of Allegheny, and State of Pennsylvania, have invented a certain new and useful Improvement in Soldering-Machines for Commutators, of which the following is a specification.

This invention relates to means for soldering the commutator bars to the leads of armatures of electric motors and generators, and has for its object to provide a complete and inexpensive machine for this purpose by means of which the labor and time consumed in this operation may be greatly lessened and the expense materially reduced.

In carrying out my invention, I provide a heating iron, preferably having a notched and curved face adapted to fit over the end and periphery of the commutator for a considerable arc, and means for rotating the one with respect to the other, whereby the commutator bars may be thoroughly and evenly heated throughout and a stick of solder applied thereto to fill the interstices and unite the leads and commutator bars as the movable part is rotated.

Another feature of my invention relates to the means for heating the iron, and comprises a heater casing with a gas burner for supporting the heating iron, and means for adjusting the casing to and from the commutator.

In the accompanying drawing, Figure 1 is a plan view of a machine embodying my invention with an armature mounted in position for soldering, the heater casing and tool being indicated in horizontal section; Fig. 2 an end elevation of the same; Fig. 3 a side elevation of the soldering tool; Fig. 4 a transverse section of the heater casing and tool, taken on the line 4—4 of Fig. 1; and Fig. 5 a similar transverse section, taken on the line 5—5 of Fig. 1.

According to the construction shown, the machine comprises a base portion 6, on which are mounted two upright supports 7, having bearings 8, in which the shaft 9 of an armature 10 may be rotatably mounted.

The soldering tool 11 is formed of a bar of copper having a notched curved face 12 adapted to fit over the outer inclined face and the periphery of the base 13 of the commutator bars 14 of the armature, whereby the same may be quickly heated to the desired degree for soldering in the leads or wires 15 which project into the slits in the base of the commutator bars.

Any desired means may be employed for heating the soldering tool, but I prefer a gas burner 16 having a casing 17 for supporting the tool and provided with partitions 18 extending transversely of the casing to form a tortuous passage for the heat products of combustion from the burner around the soldering tool, whereby the same may be very quickly brought to the desired degree of temperature.

The heater casing is carried by a sliding support 19 mounted on a bracket 20 of the base portion 6 and adapted to be adjusted transversely by means of a screw 21 and hand wheel 22.

When an armature is to be soldered, it is mounted on its shaft in bearings 8 and the soldering tool adjusted into close proximity to the base of the commutator bars by means of hand wheel 22. The curved face of the soldering tool embraces a considerable arc of the commutator and by giving intermittent partial rotations to the armature the commutator is soon heated to the desired degree. A small stick of solder is then inserted in the crevice between the upper portion of the soldering tool and the base of the commutator, and as the armature is rotated the solder melts and fills the open slits around the ends of the wires in the base of the commutator, thereby making a permanent electrical connection between each wire and its corresponding commutator bar. When the slits are all filled the tool is moved outward and the armature removed for cooling, after which the commutator is turned up in the usual way.

During the soldering operation all surplus melted solder falls from the tool beneath the armature, where it may be caught by any suitable device and afterward formed into sticks and used again. It is important that none of this melted solder should drop in among the wires back of the commutator, as this might permanently short-circuit the armature leads and render the same useless.

By means of my improved machine a great saving in the labor, time and expense involved in the soldering of armature commutators may be effected.

Having now described my invention, what

I claim as new and desire to secure by Letters Patent is:—

1. A soldering machine for commutators, comprising a soldering tool having a curved face adapted to fit the commutator, means for rotating one with respect to the other, and an adjustable heater casing for said tool.

2. A soldering machine for commutators, comprising bearings on which the armature may be rotatably mounted, a soldering tool having a curved face adapted to fit the commutator, a heater casing for the tool, and a device for adjusting the tool to and from the commutator.

3. A soldering machine for commutators, comprising a support for the armature, a soldering tool having a curved face adapted to fit the commutator, means for rotating one with respect to the other, an adjustable heater casing containing said soldering tool, and a gas burner for said casing.

4. A soldering machine for commutators, comprising a soldering tool, adapted to rotatively engage the commutator and a heater casing having a tortuous passage surrounding the tool.

5. A soldering machine for commutators, comprising a soldering tool having a curved face adapted to fit the commutator, means for rotating one with respect to the other, a heater casing having a tortuous passage surrounding the tool, and a gas burner for said casing.

6. A soldering machine for commutators, comprising bearings for rotatably supporting the armature, a soldering tool having a curved face adapted to fit the commutator, a casing having a heater and supporting the tool, and means for adjusting the casing to and from the commutator.

7. A soldering machine for commutators, comprising a soldering tool having a notched curved face adapted to fit the inclined face and periphery of the base of the commutator, means for rotating one with respect to the other, and a heating device for said tool.

In testimony whereof I have hereunto set my hand.

HARRY STONE.

Witnesses:
E. A. WRIGHT,
J. B. MacDONALD.